(12) United States Patent
Bu et al.

(10) Patent No.: US 12,530,768 B2
(45) Date of Patent: *Jan. 20, 2026

(54) SYSTEMS AND METHODS FOR IMAGE STORAGE

(71) Applicant: SHANGHAI UNITED IMAGING HEALTHCARE CO., LTD., Shanghai (CN)

(72) Inventors: Yang Bu, Shanghai (CN); Fan Chen, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,769

(22) Filed: Mar. 3, 2023

(65) Prior Publication Data

US 2023/0215002 A1  Jul. 6, 2023

Related U.S. Application Data

(63) Continuation of application No. 16/842,723, filed on Apr. 7, 2020, now Pat. No. 11,610,301.

(30) Foreign Application Priority Data

Aug. 14, 2019  (CN) .......................... 201910749838.3

(51) Int. Cl.
*G06T 7/00* (2017.01)
*G06T 5/50* (2006.01)

(52) U.S. Cl.
CPC .............. *G06T 7/0012* (2013.01); *G06T 5/50* (2013.01); *G06T 2207/10081* (2013.01); *G06T 2207/10116* (2013.01)

(58) Field of Classification Search
CPC ..................... G06T 7/0012; G06T 5/50; G06T 2207/10081; G06T 2207/10116
See application file for complete search history.

(56) References Cited

U.S. PATENT DOCUMENTS

| 6,241,668 | B1 * | 6/2001 | Herzog | ................ G16H 10/60 600/407 |
| 2002/0073429 | A1 * | 6/2002 | Beane | ................ G16H 30/20 725/105 |

(Continued)

FOREIGN PATENT DOCUMENTS

| CN | 104799874 A | 7/2015 |
| CN | 107833229 A | 3/2018 |

(Continued)

OTHER PUBLICATIONS

First Office Action in Chinese Application No. 201910749838.3 mailed on Oct. 13, 2021, 17 pages.
The Second Office Action in Chinese Application No. 201910749838.3 mailed on Jun. 2, 2022, 12 pages.

(Continued)

*Primary Examiner* — Andrew W Bee
*Assistant Examiner* — Winta Gebreslassie
(74) *Attorney, Agent, or Firm* — METIS IP LLC

(57) ABSTRACT

The present disclosure relates to systems and methods for image storage. The methods may include obtaining a first image of a subject. The methods may further include obtaining a second image of the subject. The second image may include scan status information of the subject. The scan status information may be associated with a status of the subject when the first image is acquired. And The methods may also include storing the second image correspondingly with the first image.

20 Claims, 10 Drawing Sheets

(56) References Cited

U.S. PATENT DOCUMENTS

| | | | |
|---|---|---|---|
| 2012/0183188 A1 | 7/2012 | Moriya | |
| 2013/0177222 A1* | 7/2013 | Tridandapani | A61B 5/117 |
| | | | 382/128 |
| 2015/0182191 A1* | 7/2015 | Caluser | A61B 8/5246 |
| | | | 600/407 |
| 2016/0287359 A1* | 10/2016 | Kim | A61C 13/34 |
| 2018/0161010 A1 | 6/2018 | Choi et al. | |
| 2019/0251327 A1* | 8/2019 | Laviola | A61B 8/5261 |
| 2019/0304577 A1* | 10/2019 | Kubota | G16H 10/60 |
| 2020/0402644 A1 | 12/2020 | Zhou et al. | |

FOREIGN PATENT DOCUMENTS

| | | |
|---|---|---|
| CN | 109276248 A | 1/2019 |
| JP | 2000148886 A | 5/2000 |

OTHER PUBLICATIONS

Liu, Qiutong, Research and Application of Distributed Medical Image Data Storage Technology Based on Cloud Platform, Chinese Doctoral Dissertations & Master's Theses Full-text Database (Master) Information Science and Technology, 2017, 82 pages.

Li, Jinguo, Computerized DICOM Echocardiographic Analysis System and Its Application for Quantification of Regional Wall Motion, China Excellent Doctoral and Master's Thesis Full-text Database (PhD) Medical and Health Science and Technology Series, 2010, Part 1, p. 1-61.

Li, Jinguo, Computerized DICOM Echocardiographic Analysis System and Its Application for Quantification of 5 Regional Wall Motion, China Excellent Doctoral and Master's Thesis Full-text Database (PhD) Medical and Health Science and Technology Series, 2010, Part 2, p. 62-123.

* cited by examiner

SYSTEMS AND METHODS FOR IMAGE STORAGE

CROSS-REFERENCE TO RELATED APPLICATIONS

This application is a continuation of U.S. patent application Ser. No. 16/842,723, filed on Apr. 7, 2020, which claims priority of Chinese Patent Application No. 201910749838.3 filed on Aug. 14, 2019, the contents of each of which are incorporated herein by reference in their entirety.

TECHNICAL FIELD

The present disclosure generally relates to imaging technology, and in particular, to systems and methods for image storage.

BACKGROUND

With the development of medical science and technology, medical imaging becomes more and more important. A scanning device (e.g., a magnetic resonance (MR) device, a computed tomography (CT) imaging device, an X-ray imaging device, an ultrasound device, a positron emission tomography (PET) device, a digital radiography (DR) device) can be used to perform scanning on a subject and determine scanning images based on scanning results. The scanning images can be used to analyze internal condition of the subject. In current practice, the scanning images may present the internal condition of the subject. However, scan status information of the subject during scanning cannot be traced back when a user is viewing the scanning images. In some cases, it may be beneficial for the user to understand the status information of the subject during scanning. Therefore, it is desirable to provide systems and methods for storing the scanning images and other images (e.g., optical images) of the subject that include the scan status information of the subject during scanning, such that the user can trace back to the scan status information of the subject when viewing the scanning images, thereby improving efficiency and/or accuracy in analyzing the scanning images.

SUMMARY

An aspect of the present disclosure relates to a method for image storage. The method may be implemented on at least one machine each of which has at least one processor and at least one storage device. The method may include obtaining a first image of a subject. The method may further include obtaining a second image of the subject. The second image may include scan status information of the subject. The scan status information may be associated with a status of the subject when the first image is acquired. And the method may also include storing the second image correspondingly with the first image.

In some embodiments, the method may further include storing the scan status information correspondingly with the first image.

In some embodiments, the storing the second image correspondingly with the first image may include storing the second image and the first image in a same file.

In some embodiments, the storing the second image correspondingly with the first image may include obtaining, based on the second image, character stream data corresponding to the second image, and storing the character stream data correspondingly with the first image.

In some embodiments, the obtaining, based on the second image, character stream data corresponding to the second image may include obtaining the character stream data by performing a serialization process on the second image.

In some embodiments, the storing the character stream data correspondingly with the first image may include storing the first image in a first storage file. The first storage file may include a first storage space. The storing the character stream data correspondingly with the first image may further include storing the character stream data in the first storage space of the first storage file.

In some embodiments, the storing the character stream data correspondingly with the first image may include storing the first image in a second storage file. The second storage file may include a second storage space. The storing the character stream data correspondingly with the first image may further include storing the character stream data in a third storage file, and storing path information of the third storage file in the second storage space of the second storage file.

In some embodiments, the first image and the second image may be acquired simultaneously.

In some embodiments, the first image may be a scanning image, and the second image may be an optical image.

In some embodiments, the first image may be acquired by a scanning device, and the second image may be acquired by a piece of photographic equipment. Or the first image may be acquired by a first component of a scanning device, and the second image may be acquired by a second component of the scanning device.

In some embodiments, the first image may include a 2D image, and the second image may include a video frame. Or the first image may include a 3D image, and the second image may include a video.

In some embodiments, the method may further include receiving, from a user, a request for viewing the first image, and outputting, based on the request, the first image and the second image for display.

In some embodiments, the method may further include outputting, based on the request, the scan status information for display.

In some embodiments, the outputting, based on the request, the first image and the second image for display may include obtaining, from a first storage file, the first image, obtaining, from a first storage space of the first storage file, character stream data corresponding to the second image, generating, based on the character stream data, the second image, and outputting, based on the request, the first image and the second image.

In some embodiments, the generating, based on the character stream data, the second image may include generating the second image by performing a deserialization process on the character stream data.

In some embodiments, the outputting, based on the request, the first image and the second image for display may include obtaining, from a second storage file, the first image, obtaining, from a second storage space of the second storage file, path information of a third storage file that stores character stream data corresponding to the second image, obtaining, based on the path information, the third storage file, obtaining, from the third storage file, the character stream data corresponding to the second image, generating, based on the character stream data, the second image, and outputting, based on the request, the first image and the second image.

In some embodiments, the generating, based on the character stream data, the second image may include generating the second image by performing a deserialization process on the character stream data.

In some embodiments, the method may further include determining the scan status information by analyzing the second image.

Another aspect of the present disclosure relates to a system for image storage. The system may include at least one storage medium including a set of instructions, and at least one processor in communication with the at least one storage medium. When executing the set of instructions, the at least one processor may be directed to cause the system to obtain a first image of a subject. The at least one processor may be directed further to obtain a second image of the subject. The second image may include scan status information of the subject. The scan status information may be associated with a status of the subject when the first image is acquired. And the at least one processor may be directed further to store the second image correspondingly with the first image.

A further aspect of the present disclosure relates to a non-transitory computer readable medium including at least one set of instructions for image storage. When executed by one or more processors of a computing device, the at least one set of instructions may cause the computing device to perform a method. The method may include obtaining a first image of a subject. The method may further include obtaining a second image of the subject. The second image may include scan status information of the subject. The scan status information may be associated with a status of the subject when the first image is acquired. And the method may also include storing the second image correspondingly with the first image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
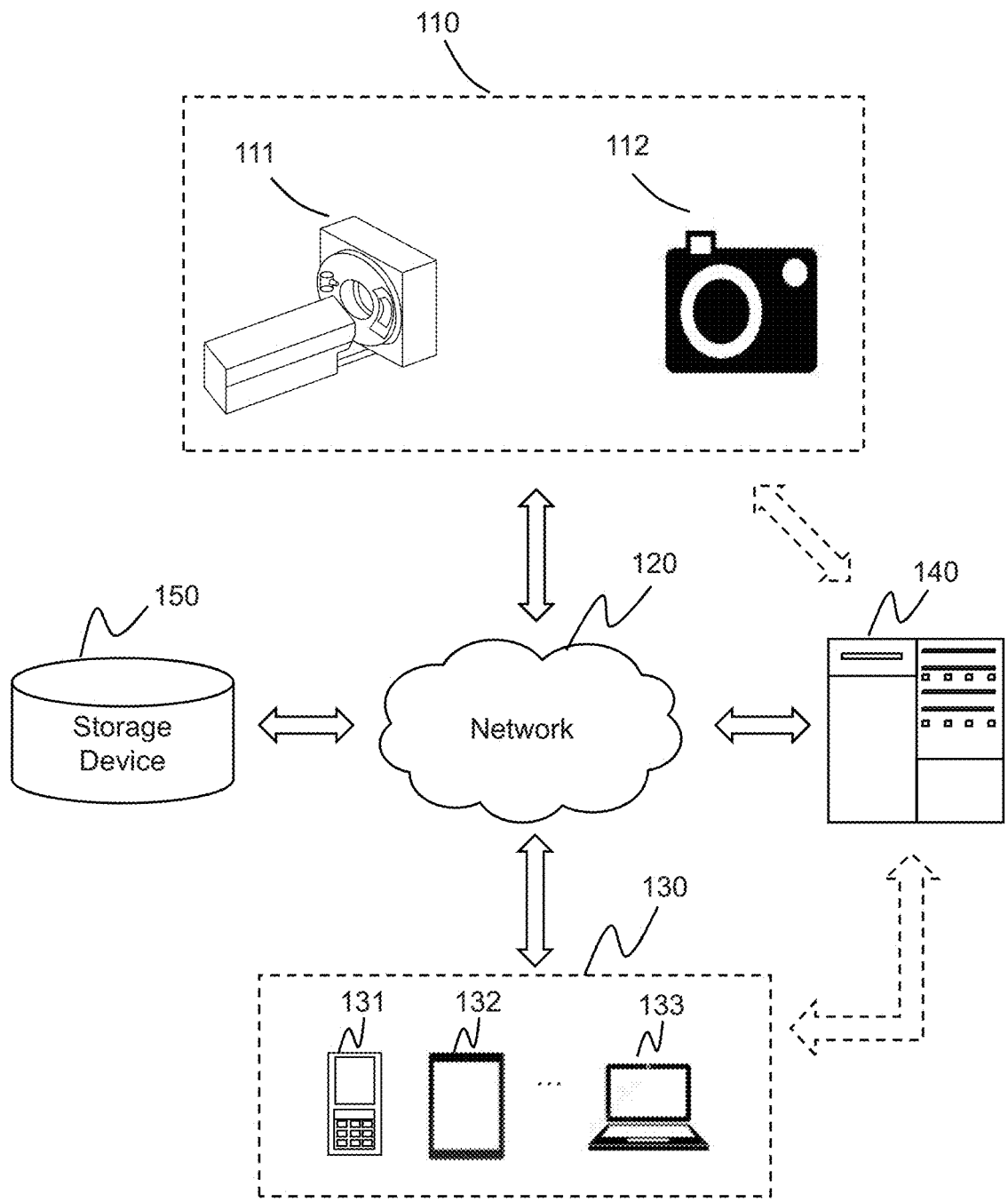
FIG. 1 is a schematic diagram illustrating an exemplary image storage system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections, or assemblies of different levels in ascending order. However, the terms may be displaced by another expression if they achieve the same purpose.

Generally, the words "module," "unit," or "block" used herein refer to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for performing on computing devices (e.g., processor 210 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to performing). Such software code may be stored, partially or fully, on a storage device of the performing computing device, for performing by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Provided herein are systems and components for medical imaging and/or medical treatment. In some embodiments, the medical system may include an imaging system. The imaging system may include a single modality imaging system and/or a multi-modality imaging system. The single modality imaging system may include, for example, a magnetic resonance imaging (MRI) system, a positron emission tomography (PET) system, an emission computed tomography (ECT) system, a computed tomography (CT) imaging system, an X-ray imaging system, a molecular imaging (MI) system, a radiation therapy (RT) system, or the like, or any combination thereof. The multi-modality imaging system may include, for example, a computed tomography-magnetic resonance imaging (MRI-CT) system, a positron emission tomography-magnetic resonance imaging (PET-MRI) system, a single photon emission computed tomography-magnetic resonance imaging (SPECT-MRI) system, a digital subtraction angiography-magnetic resonance imaging (DSA-MRI) system, a computed tomography-positron emission tomography (CT-PET) system, or the like, or any combination thereof. In some embodiments, the medical system may include a treatment system. The treatment system may include a treatment plan system (TPS), image-guide radiotherapy (IGRT), etc. The image-guide radiotherapy (IGRT) may include a treatment device and an imaging device. The treatment device may include a linear accelerator, a cyclotron, a synchrotron, etc., configured to perform a radio therapy on a subject. The treatment device may include an accelerator of species of particles including, for example, photons, electrons, protons, or heavy ions. The imaging device may include an MRI scanner, a CT scanner (e.g., cone beam computed tomography (CBCT) scanner), a digital radiology (DR) scanner, an electronic portal imaging device (EPID), etc.

An aspect of the present disclosure relates to systems and methods for image storage. The systems may obtain a first image (e.g., a scanning image) of a subject (e.g., a patient). The systems may obtain a second image (e.g., an optical image) of the subject. The second image may include scan status information of the subject which may be associated with a status of the subject when the first image is acquired. The systems may further store the second image correspondingly with the first image (e.g., in a same file). According to the systems and methods of the present disclosure, the first image may be stored and/or displayed correspondingly with the second image. A user may trace back to the second image quickly when viewing the first image, thereby assisting the user to analyze the first image effectively, efficiently and/or accurately.

FIG. 1 is a schematic diagram illustrating an exemplary image storage system according to some embodiments of the present disclosure. As illustrated, the image storage system 100 may include an imaging device 110, a network 120, a terminal device 130, a processing device 140, and a storage device 150. The components of the image storage system 100 may be connected in one or more of various ways. For example, the imaging device 110 may be connected to the processing device 140 through the network 120. As another example, the imaging device 110 may be connected to the processing device 140 directly (as indicated by the bi-directional arrow in dotted lines linking the imaging device 110 and the processing device 140). As a further example, the storage device 150 may be connected to the processing device 140 directly or through the network 120. As still a further example, the terminal device 130 may be connected to the processing device 140 directly (as indicated by the bi-directional arrow in dotted lines linking the terminal device 130 and the processing device 140) or through the network 120.

The imaging device 110 may include a scanning device 111 and a capture device 112 (e.g., a piece of photographic equipment, a piece of thermal imaging equipment, etc.). The scanning device 111 may scan an object located within its detection region and generate scanning images relating to the object. In some embodiments, the object may include a patient, a man-made object, etc. In some embodiments, the object may include a specific portion, organ, and/or tissue of a patient. For example, the object may include a head, a brain, a neck, a body, a shoulder, an arm, a thorax, a cardiac, a stomach, a blood vessel, a soft tissue, a knee, feet, or the like, or any combination thereof. In the present disclosure, "subject" and "object" are used interchangeably. In some embodiments, the scanning device 111 may include an MR scanning device, a CT scanning device, an X-ray scanning device, an ultrasound scanning device, a PET scanning device, a DR scanning device, or the like, or any combination thereof. Merely by way of example, the MR scanning device may include a main magnet assembly for providing a strong uniform main magnetic field to align the individual magnetic moments of H atoms within the object. During this process, the H atoms may oscillate around their magnetic poles at their characteristic Larmor frequency. If the object is subjected to an additional magnetic field, which is tuned to the Larmor frequency, the H atoms may absorb additional energy, which rotates the net aligned moment of the H atoms. The additional magnetic field may be provided by an RF excitation signal (e.g., RF signal generated by RF coils). When the additional magnetic field is removed, the magnetic moments of the H atoms may rotate back into alignment with the main magnetic field thereby emitting an MR signal. The MR signal may be received and processed (e.g., by Fourier transform (FT) of data in a k-space, frequency encoding, phase encoding) to form an MR image. As another example, the CT scanning device may generally include an X-ray tube that emits ionizing radiation that traverses an examination region and a portion of an object therein and illuminates a detector array disposed across the examination region, opposite to the x-ray tube. The detector may produce projection data indicative of the detected radiation, which may be reconstructed to generate volumetric image data indicative of the portion of the object. With spectral CT, the projection data may include signals which are acquired concurrently and that correspond to different photon energy ranges. There are several approaches for performing spectral CT. For example, the CT scanning device may include two or more sources, at least one source of which is configured to switch between at least two different kVps, and/or a detector array with energy-resolving detectors. As a further example, the X-ray scanning device may be configured to scan an object (e.g., a patient) using X-rays and generate image data associated with the object. The X-ray scanning device may include a scanning source, a table, a detector, or the like. The scanning source may emit X-rays to scan the object or a portion thereof located on the table. The detector may detect one or more X-rays emitted from the scanning source or scattered by the subject or a portion thereof to obtain projection values. The projection values may be transmitted and/or processed for generating a projection image.

The capture device 112 may collect one or more images (the "image" herein may refer to a single image or a frame of a video (also referred to as a video frame)) and/or a video related to the object. In some embodiments, the capture device 112 may include a camera, a video recorder, a sensor, or the like, or any combination thereof. The camera may include a gun camera, a dome camera, an integrated camera, a monocular camera, a binocular camera, a multi-view camera, or the like, or any combination thereof. The video recorder may include a PC Digital Video Recorder (DVR), an embedded DVR, or the like, or any combination thereof. The sensor may include an acceleration sensor (e.g., a piezoelectric sensor), a velocity sensor (e.g., a Hall sensor), a distance sensor (e.g., a radar, an infrared sensor), a steering angle sensor (e.g., a tilt sensor), a traction-related sensor (e.g., a force sensor), an image sensor (e.g., a visible sensor), or the like, or any combination thereof. The image acquired by the capture device 112 may include a two-dimensional image, a three-dimensional image, etc. In some embodiments, the image acquired by the capture device 112 may include an optical image. In some embodiments, the capture device 112 may acquire the image simultaneously with the scanning image. In some embodiments, the capture device 112 may transmit the acquired image to one or more components (e.g., the terminal device 130, the processing device 140, and the storage device 150) of the image storage system 100 via the network 120. In some embodiments, the capture device 112 may be integrated into the scanning device 111 (e.g., at a position closed to a radiation source of the scanning device 111) and configured as a component thereof. In some embodiments, the scanning device 111 and the capture device 112 may be configured as two independent devices.

In some embodiments, the scanning device 111 may work in coordination with the capture device 112 for acquiring a first image (e.g., a scanning image) and a second image (e.g., an optical image) simultaneously. For example, the scanning device 111 and the capture device 112 may be configured as two independent devices. A control device may be coupled to (e.g., connected to) the scanning device 111 and the capture device 112, and may be configured to control working timing (or working sequence) of the scanning device 111 and the capture device 112, respectively. As another example, when the scanning device 111 performs a scanning process on a subject for acquiring a first image, a trigger signal may be generated and sent from the scanning device 111 to the capture device 112 to cause the capture device 112 to acquire a second image simultaneously. As a further example, the capture device 112 may be integrated into the scanning device 111 and configured as a component thereof. When the scanning device 111 performs a scanning process on a subject for acquiring a first image, a control device associated with the scanning device 111 may control working timing of the capture device 112. In such cases, the scanning device 111 and the capture device 112 may work simultaneously for acquiring the first image and the second image, and accordingly, the second image may be acquired during scanning of the subject, and the second image may include scan status information of the subject. The scan status information may be associated with a status of the subject when the first image is acquired.

The network 120 may include any suitable network that can facilitate the exchange of information and/or data for the image storage system 100. In some embodiments, one or more components (e.g., the imaging device 110, the terminal device 130, the processing device 140, the storage device 150) of the image storage system 100 may communicate with one or more other components of the image storage system 100 via the network 120. For example, the imaging device 110 may transmit a scanning image and/or an optical image to the storage device 150 via the network 120 for storage. In some embodiments, the network 120 may be any type of wired or wireless network, or a combination thereof. The network 120 may be and/or include a public network (e.g., the Internet), a private network (e.g., a local area network (LAN), a wide area network (WAN), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the image storage system 100 may be connected to the network 120 to exchange data and/or information.

The terminal device 130 may include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, smart footgear, a pair of smart glasses, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a Hololens, a Gear VR, etc. In some embodiments, the imaging device 110 and/or the processing device 140 may be remotely operated through the terminal device 130. In some embodiments, the imaging device 110 and/or the processing device 140 may be operated through the terminal device 130 via a wireless connection. In some embodiments, the terminal device 130 may receive information and/or instructions inputted by a user, and send the received information and/or instructions to the imaging device 110 or the processing device 140 via the network 120. In some embodiments, the terminal device 130 may receive data and/or information from the processing device 140. In some embodiments, the terminal device 130 may be part of the processing device 140. In some embodiments, the terminal device 130 may be omitted.

The processing device 140 may process data and/or information obtained from the imaging device 110, the terminal device 130, the storage device 150, and/or any other components associated with the image storage system 100. For example, the processing device 140 may obtain a scanning image and/or an optical image from the imaging device 110, and/or store the optical image correspondingly with the scanning image in the storage device 150. As another example, a user may input a request for viewing the scanning image by using the terminal device 130. The processing device 140 may obtain the request from the terminal device 130, and/or further output, based on the request, the scanning image and/or the optical image for display. In some embodiments, the processing device 140 may be a single server or a server group. The server group may be centralized or distributed. In some embodiments, the processing device 140 may be local or remote. For example, the processing device 140 may access information and/or data stored in or acquired by the imaging device 110, the terminal device 130, the storage device 150, and/or any other components associated with the image storage system 100 via the network 120. As another example, the processing device 140 may be directly connected to the imaging device 110 (as illustrated by the bidirectional arrow in dashed lines connecting the processing device 140 and the imaging device 110 in FIG. 1), the terminal device 130 (as illustrated by the bidirectional arrow in dashed lines connecting the processing device 140 and the terminal device 130 in FIG. 1), and/or the storage device 150 to access stored or acquired information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 200 having one or more components illustrated in FIG. 2 in the present disclosure.

The storage device 150 may store data and/or instructions. In some embodiments, the storage device 150 may store data obtained from the imaging device 110, the terminal device 130, and/or the processing device 140. For example, the storage device 150 may store a scanning image and an optical image in a same file. In some embodiments, the storage device 150 may store data and/or instructions that the processing device 140 may execute or use to perform exemplary methods described in the present disclosure. For example, the storage device 150 may store instructions that the processing device 140 may execute to output a scanning image and/or an optical image for display. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the imaging device 110, the processing device 140, the terminal device 130) of the image storage system 100. One or more components of the image storage system 100 may access the data or instructions stored in the storage device 150 via the network 120. In some embodiments, the storage device 150 may be directly connected to or communicate with one or more components (e.g., the imaging device 110, the processing device 140, the terminal device 130) of the image storage system 100. In some embodiments, the storage device 150 may be part of the processing device 140. In some embodiments, the storage device 150 may be part of the terminal device 130.

In some embodiments, the image storage system 100 may further include one or more power supplies (not shown in FIG. 1) connected to one or more components (e.g., the imaging device 110, the processing device 140, the terminal device 130, the storage device 150) of the image storage system 100.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 2:
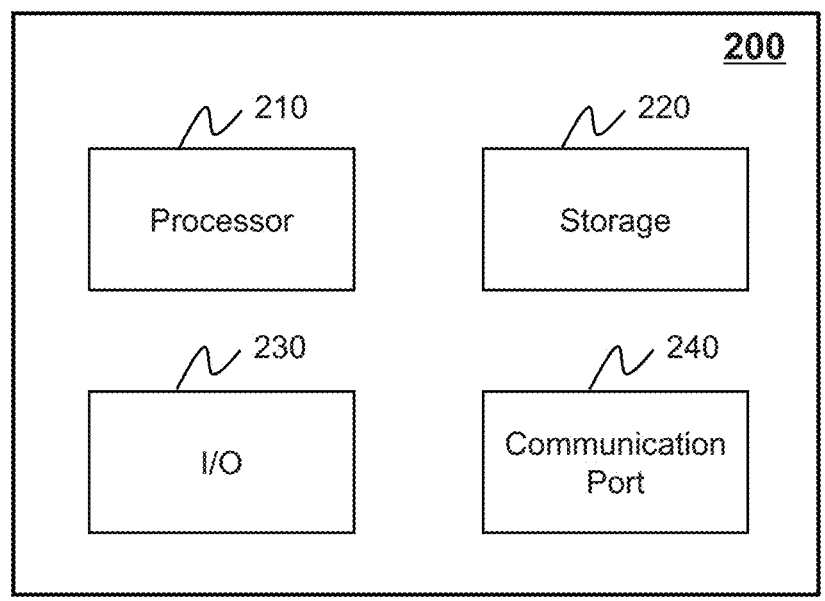
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the processing device 140 may be implemented on the computing device 200. As illustrated in FIG. 2, the computing device 200 may include a processor 210, a storage 220, an input/output (I/O) 230, and a communication port 240.

The processor 210 may execute computer instructions (program code) and perform functions of the processing device 140 in accordance with techniques described herein. The computer instructions may include routines, programs, objects, components, signals, data structures, procedures, modules, and functions, which perform particular functions described herein. For example, the processor 210 may obtain a first image (e.g., a scanning image) and a second image (e.g., an optical image) of a subject. In some embodiments, the processor 210 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be noted that the computing device 200 in the present disclosure may also include multiple processors, and thus operations of a method that are performed by one processor as described in the present disclosure may also be jointly or separately performed by the multiple processors. For example, if in the present disclosure the processor of the computing device 200 executes both operations A and B, it should be understood that operations A and B may also be performed by two different processors jointly or separately in the computing device 200 (e.g., a first processor executes operation A and a second processor executes operation B, or the first and second processors jointly execute operations A and B).

The storage 220 may store data/information obtained from the imaging device 110, the terminal device 130, the storage device 150, or any other component of the image storage system 100. For example, the storage 220 may store a second image (e.g., an optical image) and/or scan status information of a subject correspondingly with a first image (e.g., a scanning image) of the subject. In some embodiments, the storage 220 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 140 for obtaining character stream data corresponding to a second image (e.g., an optical image) by performing a serialization process on the second image.

The I/O 230 may input or output signals, data, or information. In some embodiments, the I/O 230 may enable user interaction with the processing device 140. In some embodiments, the I/O 230 may include an input device and an output device. Exemplary input devices may include a keyboard, a mouse, a touch screen, a microphone, a trackball, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

Merely by way of example, a user (e.g., an operator) may input data related to an object (e.g., a patient) that is being/to be imaged/scanned via the I/O 230. The data related to the object may include identification information (e.g., a name, an age, a gender, a height, a weight, a medical history, contract information, a physical examination result). The user may also input parameters needed for the operation of the imaging device 110, such as image contrast and/or ratio, a region of interest (ROI), slice thickness, an imaging type, a scan type, a sampling type, or the like, or any combination thereof. The I/O 230 may also display images obtained from the imaging device 110, the storage device 150, and/or the storage 220. For example, a user (e.g., an operator) may input a request for viewing a first image (e.g., a scanning image) stored in the storage device 150 via the I/O 230 (e.g., an input device). The processing device 140 may output the first image and/or a second image (e.g., an optical image) for display based on the request. The first image and/or the second image may be displayed via the I/O 230 (e.g., an output device).

The communication port 240 may be connected to a network (e.g., the network 120) to facilitate data communications. The communication port 240 may establish connections between the processing device 140 and the imaging device 110, the terminal device 130, the storage device 150, or any other component of the image storage system 100. The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
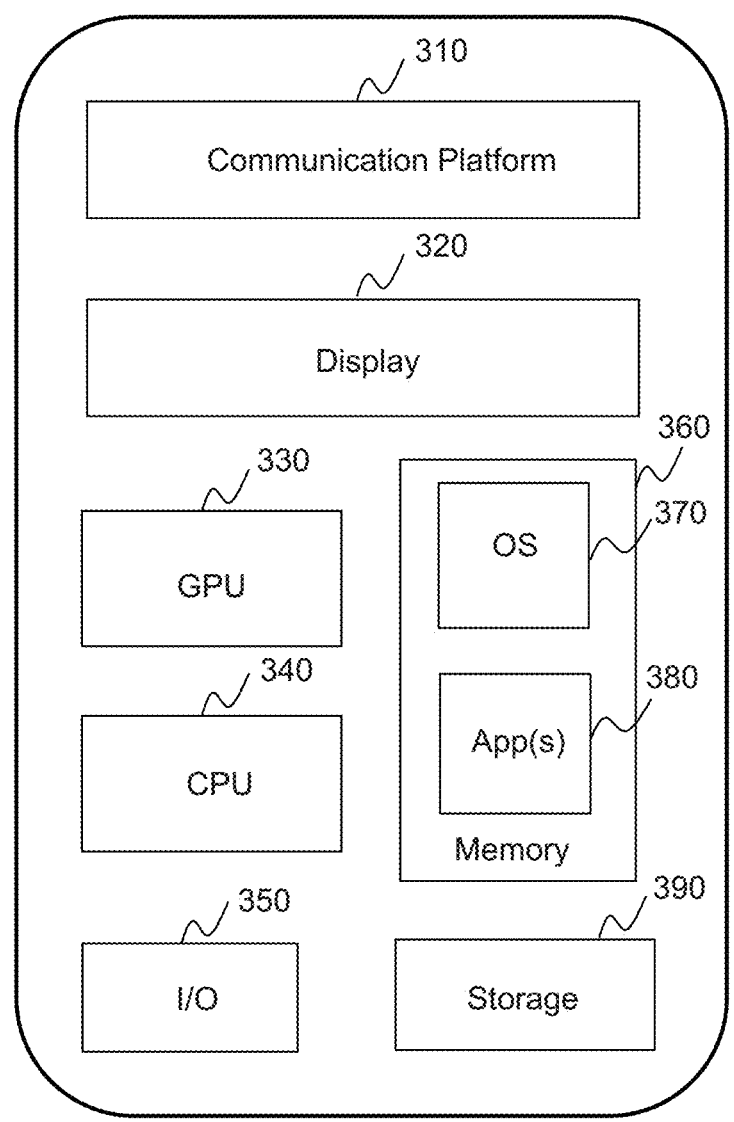
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal device 130 may be implemented on the mobile device 300. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, a mobile operating system 370 (e.g., iOS, Android, Windows Phone) and one or more applications 380 may be loaded into the memory 360 from the storage 390 in order to be executed by the CPU 340. The applications 380 may include a browser or any other suitable mobile apps for receiving and rendering information relating to image storage or other information from the processing device 140. User interactions with the information stream may be achieved via the I/O 350 and provided to the processing device 140 and/or other components of the image storage system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the image storage as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
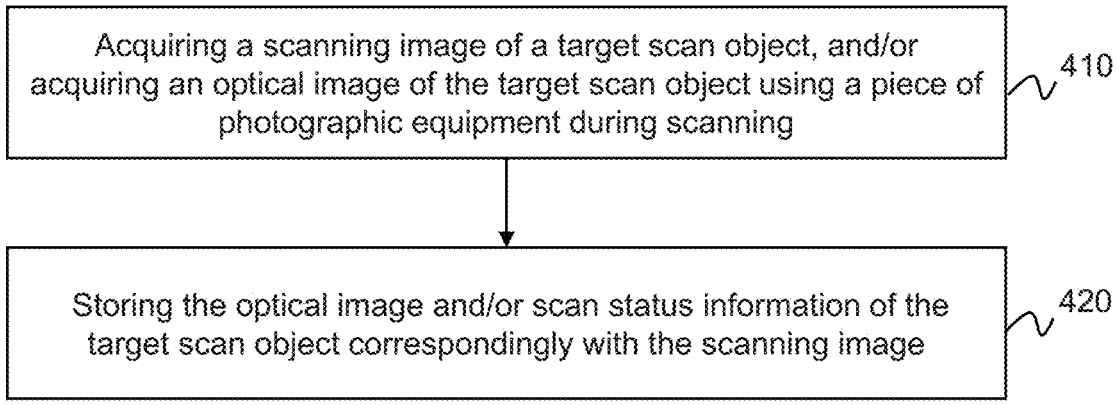
FIG. 4 is a flowchart illustrating an exemplary process for image storage according to some embodiments of the present disclosure.

FIG. 4 is a flowchart illustrating an exemplary process for image storage according to some embodiments of the present disclosure. In some embodiments, the process 400 may be implemented by an image storage system (e.g., the image storage system 100). In some embodiments, the image storage system may be implemented by software and/or hardware, and/or may be integrated in an image storage device. In some embodiments, at least part of process 400 may be performed by the processing device 140 (implemented in, for example, the computing device 200 shown in FIG. 2). For example, the process 400 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, one or more modules or units illustrated in FIG. 8). The operations of the illustrated process presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In 410, a scanning image (also referred to as "first image") of a target scan object (also referred to as "subject") may be obtained, and/or an optical image (also referred to as "second image") of the target scan object may be obtained. In some embodiments, the processing device 140 (e.g., the obtaining module 810 illustrated in FIG. 8) may preform operation 410. In some embodiments, the scanning image may be acquired by a scanning device (e.g., the scanning device 111). In some embodiments, the optical image may be acquired by a capture device (e.g., the capture device 112). The capture device may include a piece of photographic equipment. In some embodiments, the optical image may be acquired during scanning of the target scan object.

As used herein, the target scan object may include a patient, a man-made object, etc. In some embodiments, the target scan object may include a specific portion, organ, and/or tissue of a patient. For example, the target scan object may include a head, a brain, a neck, a body, a shoulder, an arm, a thorax, a cardiac, a stomach, a blood vessel, a soft tissue, a knee, feet, or the like, or any combination thereof. In some embodiments, the scanning image may include or refer to a medical image acquired based on an interaction between the target scan object (e.g., a human body) and a medium provided by a medical imaging device (also referred to as "scanning device", e.g., the scanning device 111 illustrated in FIG. 1). The scanning image may be used to express internal information (e.g., a structure and/or a density of internal tissues and organs of the human body) of the target scan object. Exemplary mediums may include an X-ray, an electromagnetic field, an ultrasonic wave, or the like, or any combination thereof. Exemplary medical imaging devices may include an MR scanning device, a CT scanning device, an X-ray scanning device, an ultrasound scanning device, a PET scanning device, a DR scanning device, or the like, or any combination thereof. In some embodiments, the scanning image may be a two-dimensional (2D) image, a three-dimensional (3D) image, etc. In some embodiments, the scanning image may be obtained from a storage device (e.g., the storage device 150) disclosed elsewhere in the present disclosure. In some embodiments, the scanning image may be obtained from the medical imaging device directly.

In some embodiments, the optical image may be acquired using a piece of photographic equipment. Exemplary photographic equipment may include a camera, a video recorder, a sensor, or the like, or any combination thereof. In some embodiments, the piece of photographic equipment or a portion thereof may be installed or disposed at a position closed to a radiation source of the medical imaging device. For example, the piece of photographic equipment may be installed inside the medical imaging device and/or configured as a component thereof. Optionally or additionally, the piece of photographic equipment or a portion thereof may be installed at any other position. For example, the piece of photographic equipment may include two or more cameras installed inside and/or outside the medical imaging device, each of the two or more cameras may be used to acquire a 2D image of the target scan object, and two or more 2D images may be combined to generate 3D image(s) of the target scan object. In some embodiments, the optical image may be acquired during a scanning process of the target scan object.

The optical image may be generated, stored, or presented in a form of an image, a video frame, a video, etc. For example, if the scanning process takes a relatively short time, the optical image may be an image (e.g., an image may be generated by the piece of photographic equipment during the scanning process); if the scanning process takes a relatively long time, the optical image may be a video (e.g., a video may be generated by the piece of photographic equipment during the scanning process). As another example, if the scanning image is a 2D image, the corresponding optical image may be a video frame; if the scanning image is a 3D image, the corresponding optical image may be a video.

Taking a CT scanning process as an example, the CT scanning process may take a relatively long time in which scan data of the target scan object may be acquired, and accordingly, the piece of photographic equipment may acquire a video of the target scan object during the CT scanning process. Further, a 2D tomographic image corresponding to a specific time point of the CT scanning process may be obtained by performing an image reconstruction process on at least part of the scan data, and the 2D tomographic image may be associated with (or correspond to) a video frame at the specific time point in the video. In such cases, the 2D tomographic image may be determined as the scanning image, and the video frame may be determined as the optical image. Alternatively or additionally, a 3D image (and/or a plurality of 2D tomographic images corresponding to a plurality of (e.g., each) time point of the CT scanning process) may be obtained based on the scan data. In such cases, the 3D image may be determined as the scanning image, and the video may be determined as the optical image.

In some embodiments, the optical image and the scanning image may be acquired simultaneously. For example, signals and/or instructions may be sent to the medical imaging device and the piece of photographic equipment (e.g., at the same time) to cause the medical imaging device and the piece of photographic equipment to work simultaneously. In such cases, the optical image and the scanning image may be acquired simultaneously. Optionally or additionally, the optical image may be acquired with a delay (e.g., a delay of milliseconds, a delay of tens of milliseconds, a delay of hundreds of milliseconds, etc.), and accordingly, the optical image may correspond to the scanning image with an allowable time error. In some embodiments, the optical image and/or the scanning image may include timestamp information or may be associated with the timestamp information. In such cases, the optical image may correspond to the scanning image based partially on the timestamp information, and accordingly, the optical image may be stored and/or displayed correspondingly with the scanning image. In some embodiments, a shooting angle of the optical image may be the same as or similar to a scanning angle of the scanning image, so that a perspective of the optical image may be the same as or similar to a perspective of the scanning image. In some embodiments, a shooting region of the optical image may be the same as or similar to a scanning region of the scanning image. In some embodiments, the shooting region of the optical image may include and/or be larger than the scanning region of the scanning image, so that the optical image may at least include surface information of the scanning region of the scanning image. In some embodiments, the positions at which the piece of photographic equipment are mounted may be designed and/or adjusted according to the shooting angle and/or the shooting region of the scanning image. For example, the piece of photographic equipment may be mounted at a position close to or adjacent to a radiation source of the medical imaging device such that the shooing angle and/or the shooting region of the optical image may include, or be the same as or similar to the shooing angle and/or the scanning region of the scanning image. As another example, scanning parameters (e.g., a scanning angle) of the scanning image may be predetermined, and the piece of photographic equipment may be adjusted to a corresponding position such that the piece of photographic equipment may acquire the optical image from a same or similar shooting angle as the scanning image. In some embodiments, the scanning image may include scan data of the target scan object acquired from a plurality of scanning angles, and the optical image may be a video related to surface information acquired from a plurality of shooting angles. Taking a CT scanning process as an example, an X-ray tube and a detector may rotate around a target scan object for acquiring scan data (e.g., 3D volume data) of the target scan object from a plurality of scanning angles, and accordingly, a piece of photographic equipment may rotate around the target scan object for acquiring a video including surface information of the target scan object during the CT scanning process.

In some embodiments, the scanning image may be used to express internal information of the target scan object, such as morphology, a structure, a density and/or a function of internal tissues and organs of a human body. The optical image may be used to express surface information of the target scan object, such as a surface status, a posture, an occlusion or shelter on the human body. In some embodiments, the optical image may be acquired during a scanning process of the target scan object in which the scanning image is acquired, so that surface information of the target scan object during scanning may be obtained based on the optical image, and/or may be used for or facilitate further processing or analysis of the scanning image (e.g., diagnosis of disease, treatment, image quality assessment, or the like, or a combination thereof).

In some embodiments, the optical image may include scan progress information of the target scan object. As used herein, the scan progress information may refer to information related to and/or parameters used in a scanning process, such as a scanning time, a scanning angle, a scanning range, a scanning path, a scanning distance, or the like, or any combination thereof. In some embodiments, the optical image may include scan status information of the target scan object. As used herein, the scan status information may refer to information associated with a status of the target scan object when the scanning image is acquired. In some embodiments, the scan status information may include a shooting angle of the optical image, a shooting region of the optical image, a posture of the target scan object, a position of the target scan object, a shelter of the target scan object (e.g., a shelter that covers a portion of the target scan object or the shooting region thereof), a respiration phase of the target scan object, a cardiac phase of the target scan object, or the like, or any combination thereof.

In some embodiments, the scan status information or a portion thereof may be obtained based on the optical image. For example, at least part of the scan status information may be obtained by analyzing the optical image. As another example, the shooting region of the optical image may be obtained based on a mark (e.g., a cross mark, a highlighted mark, etc.) projected on the target scan object when acquiring the optical image. In some embodiments, the mark may be generated by a projection device installed into (or disposed at a position closed to) the piece of photographic equipment and may be further projected in the shooting region. As a further example, the posture of the target scan object may be obtained by performing an image recognition process (e.g., based on an image recognition algorithm, an image recognition model, etc.) on the optical image. As still a further example, whether there is a shelter on the target scan object may be determined or the shelter of the target scan object may be identified by performing an image recognition process on the optical image.

In some embodiments, the scan status information or a portion thereof may be obtained by using an external device. For example, the respiration phase and/or the cardiac phase of the target scan object may be obtained by using external device(s). Exemplary external devices may include a sensor (e.g., a pressure detecting sensor (e.g., an elastic breathing band or a respiratory pressure pad configured to obtain a respiration motion curve of the target scan object)), an electrode (e.g., an electrocardiogram (ECG) electrode configured to obtain a cardiac motion curve of the target scan object), or the like (e.g., a pulse detecting clip, and/or a finger sleeve configured to obtain a cardiac motion curve of the target scan object), or a combination thereof.

In some embodiments, the scan status information or a portion thereof may be obtained based on the scanning parameters (e.g., a scanning angle, a scanning range, a scanning path, a scanning distance, etc.) used in acquiring the corresponding scanning image. For example, because a shooting angle of the optical image acquired by the piece of photographic equipment may be adjusted according to a scanning angle of the scanning image acquired by the medical imaging device, the shooting angle of the optical image may be obtained based on the scanning angle of the scanning image. As another example, the position of the target scan object may be obtained based on hardware information (e.g., a coordinate and/or an angle associated with a gantry, a table, an X-ray tube, etc.) of the medical imaging device.

In some embodiments, the scan status information or a portion thereof may be shown in the optical image directly. In some embodiments, the scan status information or a portion thereof may be presented in any other form (e.g., in a form of text, in a form of curve, in a form of a mark, in a form of brightness variation (see FIG. 5A or 6A), etc.). In some embodiments, the scan status information of the target scan object may be used for or facilitate further processing or analysis of the scanning image (e.g., diagnosis of disease, treatment, image quality assessment, or the like, or a combination thereof). For example, if there are artifacts in the scanning image, a user may check the optical image and determine whether there is an occlusion or shelter on the target scan object during the scanning process, or whether there is a lesion (e.g., injury) in the target scan object.

Figure 5A:
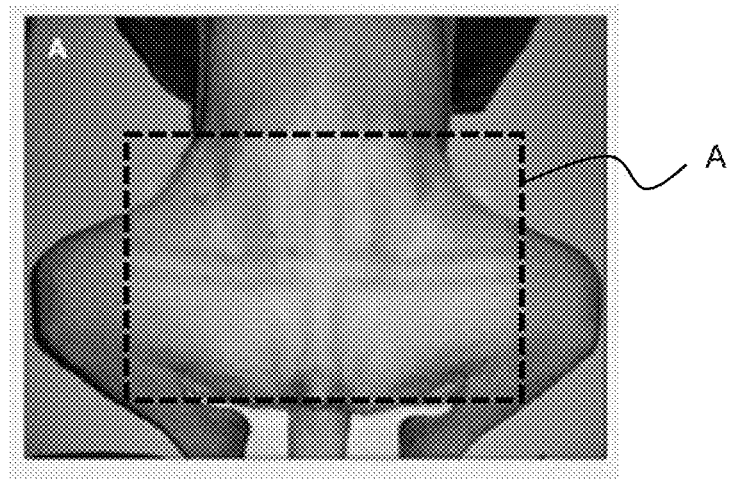
FIG. 5A is an exemplary optical image of a subject according to some embodiments of the present disclosure.
Figure 5B:
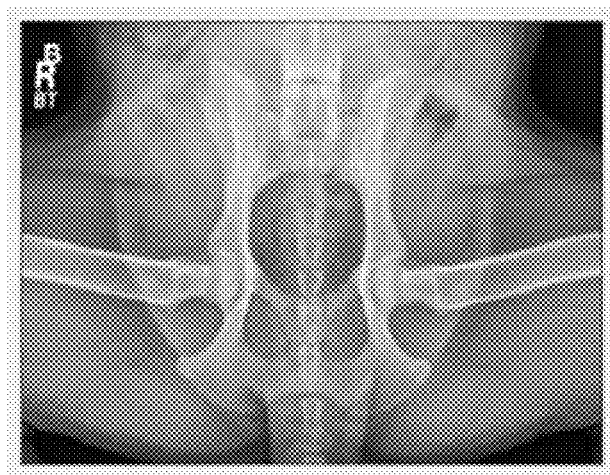
FIG. 5B is an exemplary scanning image of a subject according to some embodiments of the present disclosure.
Figure 6A:
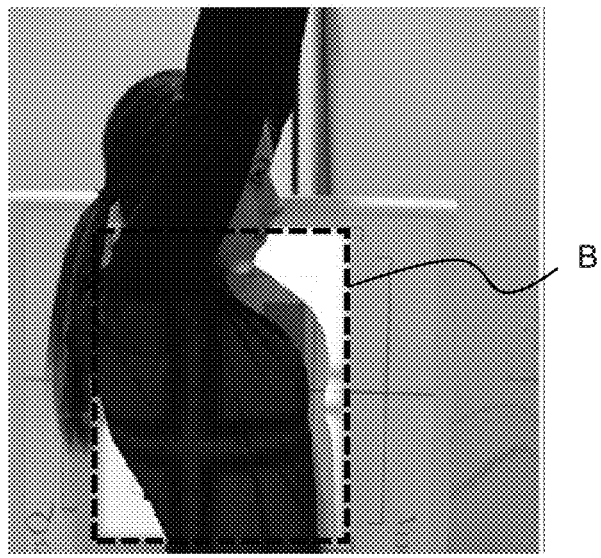
FIG. 6A is another exemplary optical image of a subject according to some embodiments of the present disclosure.
Figure 6B:
FIG. 6B is another exemplary scanning image of a subject according to some embodiments of the present disclosure.

FIG. 5A illustrates an optical image of a back region of an object (e.g., an animal). FIG. 5B illustrates a scanning image (e.g., a DR image) of the back region of the object corresponding to the optical image shown in FIG. 5A. FIG. 5A and FIG. 5B may be acquired simultaneously, and the shooting angle of the optical image shown in FIG. 5A may be the same as or similar to the scanning angle of the scanning image shown in FIG. 5B. The object in FIGS. 5A and 5B may be in a same posture. FIG. 6A illustrates an optical image of a chest region of an object (e.g., a human body). FIG. 6B illustrates a scanning image (e.g., a DR image) of the chest region of the object corresponding to the optical image shown in FIG. 6A. FIG. 6A and FIG. 6B may be acquired simultaneously, and the shooting angle of the optical image shown in FIG. 6A may be the same as or similar to the scanning angle of the scanning image shown in FIG. 6B. The object in FIGS. 6A and 6B may be in a same posture. As shown in FIG. 5A (and/or FIG. 6A), a relatively bright region (e.g., the region A in FIG. 5A (or the region B in FIG. 6A)) may correspond to a scanning region of the scanned object in FIG. 5B (or FIG. 6B). Accordingly, the relatively bright region in FIG. 5A (and/or FIG. 6A) may be used as reference information in viewing, processing, or analyzing the DR images shown in FIG. 5B (and/or FIG. 6B). For example, whether an occlusion or shelter is present on the scanned object may be determined according to the relatively bright region. As another example, a surface condition of the scanned object may be determined according to the relatively bright region. Therefore, in practical applications, an optical image and a scanning image of a same target scan object may be acquired simultaneously, so that a user (e.g., a doctor) may trace scan status information of the target scan object accurately when analyzing the scanning image, thereby assisting or facilitating the user to analyze the scanning image effectively, efficiently, and/or accurately based on the optical image.

In 420, the optical image and/or the scan status information of the target scan object may be stored correspondingly with the scanning image. In some embodiments, the processing device 140 (e.g., the storing module 820 illustrated in FIG. 8) may preform operation 420.

In some embodiments, the optical image may be stored correspondingly with the scanning image. In some embodiments, the scan status information may be stored correspondingly with the scanning image. Taking an optical image in JPEG format as an example, in an image storage process, the optical image in the JPEG format may be stored correspondingly with the scanning image. Optionally or additionally, the optical image in the JPEG format may be analyzed and converted into data or information in any other format (e.g., a model image, a flash animation, text information, or the like, or any combination thereof). The converted data or information may represent the scan status information or a portion thereof. In some embodiments, the converted data or information may be stored correspondingly with the scanning image.

In some embodiments, to store the optical image (and/or the scan status information) correspondingly with the scanning image, the optical image (and/or the scan status information) of the target scan object may be stored in a same file (e.g., a Digital Imaging and Communications in Medicine (DICOM) standard format file) as the scanning image.

In some embodiments, to store the optical image (and/or the scan status information) of the target scan object correspondingly with the scanning image, the optical image (and/or the scan status information) of the target scan object may be converted to a same format as the scanning image. Merely by way of example, after a scanning process using a medical imaging device, a file (e.g., a DICOM standard format file) that stores data including a scanning image of a target scan object may be generated. An optical image of the target scan object in a non-DICOM format (e.g., a JPG format, a JPEG format, a BMP format, a GIF format, a PNG format, etc.) may be acquired by a piece of photographic equipment simultaneously with the scanning process. In such cases, the optical image may be converted into a same format (e.g., the DICOM format) as the scanning image such that the optical image may be stored correspondingly with the scanning image. More descriptions regarding the storing of the optical image and/or the scan status information of the target scan object correspondingly with the scanning image may be found elsewhere in the present disclosure (e.g., FIG. 7, FIG. 9 and the descriptions thereof).

It should be noted that the above description of the process 400 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, although only one piece of photographic equipment is illustrated in process 400, it should be understood that there may be two or more pieces of photographic equipment configured to acquire optical images. Correspondingly, two or more optical images may be acquired simultaneously with the scanning image in operation 410.

Figure 7:
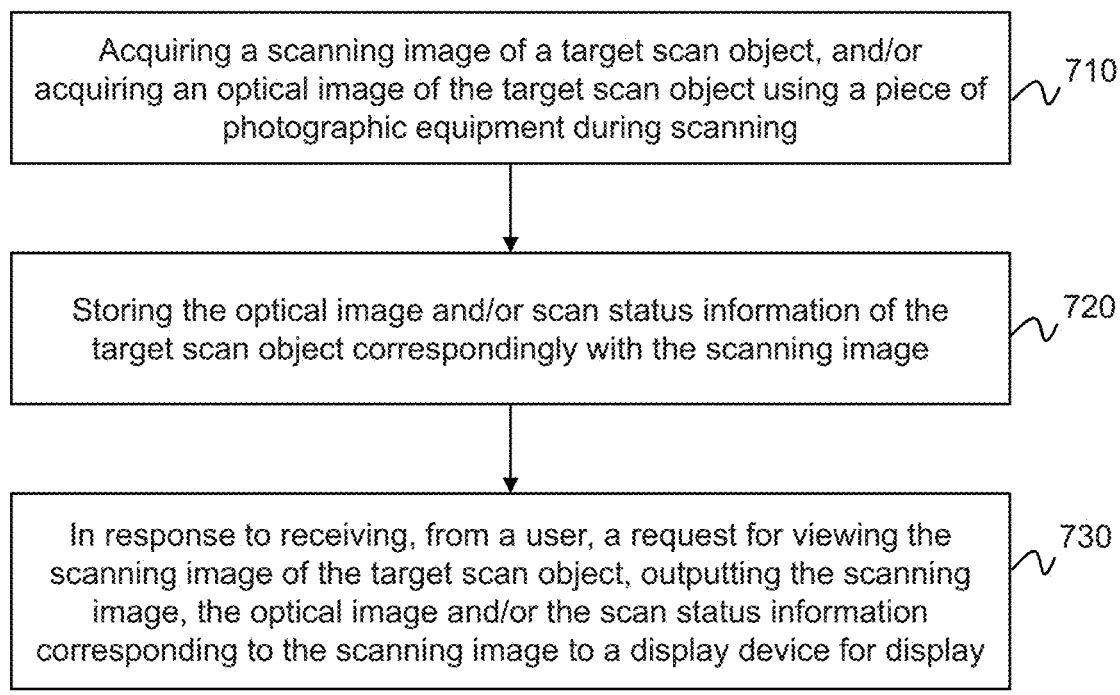
FIG. 7 is a flowchart illustrating another exemplary process for image storage according to some embodiments of the present disclosure.

FIG. 7 is a flowchart illustrating another exemplary process for image storage according to some embodiments of the present disclosure. In some embodiments, at least part of process 700 may be performed by the processing device 140 (implemented in, for example, the computing device 200 shown in FIG. 2). For example, the process 700 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, one or more modules or units illustrated in FIG. 8). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 710, a scanning image (also referred to as "first image") of a target scan object (also referred to as "subject") may be obtained, and/or an optical image (also referred to as "second image") of the target scan object may be obtained (e.g., using a piece of photographic equipment) during a scanning process of the scanning image. In some embodiments, the processing device 140 (e.g., the obtaining module 810 illustrated in FIG. 8) may preform operation 710.

In some embodiments, as described in connection with FIG. 4, the scanning image may include or refer to a medical image obtained based on an interaction between the target scan object (e.g., a human body) and a medium provided by a medical imaging device (also referred to as "scanning device", e.g., the scanning device 111 illustrated in FIG. 1). The scanning image may be used to express internal information (e.g., a structure and/or a density of internal tissues and organs of the human body) of the target scan object. In some embodiments, the optical image may be acquired using a piece of photographic equipment. In some embodiments, the optical image and the scanning image may be acquired simultaneously. In some embodiments, the optical image may include scan status information of the target scan object. More descriptions of the scan status information may be found elsewhere in the present disclosure (e.g., FIG. 4 and descriptions thereof).

In 720, the optical image and/or the scan status information of the target scan object may be stored correspondingly with the scanning image. In some embodiments, the processing device 140 (e.g., the storing module 820 illustrated in FIG. 8) may preform operation 720.

In some embodiments, to store the optical image (and/or the scan status information) of the target scan object correspondingly with the scanning image, the optical image (and/or the scan status information) of the target scan object may be converted to a same format as the scanning image. Specifically, in some embodiments, character stream data may be obtained by performing a serialization process on the optical image (and/or the scan status information) of the target scan object according to a predetermined format. As used herein, the serialization process of the optical image (and/or the scan status information) of the target scan object may refer to a process of transforming information of the optical image (and/or the scan status information) of the target scan object into a stream of bytes that can be stored or transmitted to memory, a database, and/or a file. In some embodiments, the predetermined format may include a format (e.g., an original format) of the scanning image (e.g., the DICOM standard format). Exemplary character stream data in the DICOM standard format may include preamble characters, prefix characters, and data element characters. Different characters may be used to store different information. For example, the preamble characters may store information enabling a multi-media application to randomly access data (e.g., an image) stored in a DICOM file. As another example, the prefix characters may store information used to recognize whether a current file is a DICOM File. As a further example, the data element characters may store information related to the optical image (and/or the scan status information) of the target scan object.

Further, the character stream data may be stored correspondingly with the scanning image. In some embodiments, the character stream data and the scanning image may be stored in a same file. Specifically, in some embodiments, the scanning image may be stored in a storage file (also referred to as "a first storage file"), and the character stream data may be stored in a pre-created storage space (also referred to as "a first storage space") of the storage file. In such cases, the character stream data may be stored correspondingly with the scanning image. In some embodiments, the storage file may be a DICOM standard format file, and the pre-created storage space may be a private tag space of the DICOM standard format file. As used herein, the private tag space may refer to a space reserved by a user in the DICOM standard format file for private use. In some embodiments, each of the data element characters may include a tag space. The private tag space may be a specific tag space (or a pre-defined tag space) included in the data element characters. In some embodiments, the character stream data be generated and/or stored correspondingly with the scanning image in real-time during the scanning process of the scanning image. In some embodiments, the character stream data be generated and/or stored correspondingly with the scanning image after the scanning process is finished or terminated.

In some embodiments, the character stream data may be stored correspondingly with the scanning image based on path information of a storage file of the character stream data. Specifically, in some embodiments, the scanning image may be stored in a second storage file (e.g., a DICOM standard format file), and the character stream data may be stored in a third storage file. The second storage file may include a second storage space (e.g., a private tag space). The path information of the third storage file may be stored in the second storage space of the second storage file. As used herein, the path information of the third storage file may refer to a general form of the name of the third storage file which specifies a unique location in a file system in which the third storage file is stored. For example, the path information of the third storage file may include folder line information that can be traversed when the third storage file is retrieved. In some embodiments, the path information of the third storage file may be stored in the second storage space of the second storage file so that the second storage file is associated with the third storage file. In such cases, the character stream data may be stored correspondingly with the scanning image based on the path information. In some embodiments, the scanning image may be in the DICOM standard format, and the path information may be stored in a private tag space of the DICOM standard format file. Optionally or additionally, the optical image (and/or the scan status information) of the target scan object may be directly stored (e.g., without being serialized to character stream data) in the third storage file. In such cases, the optical image (and/or the scan status information) of the target scan object may be stored correspondingly with the scanning image based on the path information directly.

In 730, the scanning image, the optical image and/or the scan status information corresponding to the scanning image may be output according to a request of a user. In some embodiments, the processing device 140 (e.g., the output module 830 illustrated in FIG. 8) may preform operation 730. In some embodiments, in response to receiving, from a user, a request for viewing the scanning image of the target scan object, the processing device 140 may output the scanning image, the optical image and/or the scan status information corresponding to the scanning image to a display device for display.

In some embodiments, the request may be input by the user via a computing device (e.g., the I/O 230 of the computing device 200) or a mobile device (e.g., the I/O 350 of the mobile device 300). For example, the I/O 230 or the I/O 350 may include an input device such as a keyboard, a mouse, a touch screen, a microphone, a trackball, or the like, or a combination thereof, and the user may input the request by using the input device. In some embodiments, the request may be further provided or transmitted to the processing device 140 and/or other components of the image storage system 100 (e.g., via the network 120). In some embodiments, the display device may be an output device of the I/O 230 or the I/O 350.

In some embodiments, the scanning image may be stored in a storage file (e.g., the first storage file), and the character stream data corresponding to the optical image (and/or the scan status information) may be stored in a (pre-created) storage space of the storage file. In response to receiving the request for viewing the scanning image of the target scan object from the user, the scanning image may be obtained or read from the storage file. Further, target character stream data (also referred to as data in a target character stream) may be obtained from the pre-created storage space of the storage file. The target character stream data may refer to the character stream data of the optical image (and/or the scan status information) corresponding to the scanning image. In some embodiments, the scanning image may be stored in a DICOM standard format, and the target character stream data obtained from the pre-created storage space of the storage file of the scanning image may also be in the DICOM standard format. In some embodiments, the target character stream data in the DICOM standard format may not be displayed directly. In such cases, the target character stream data may be converted into one or more other formats for display. For example, the target character stream data may be converted into an optical image of an image format such as a JPG format, a JPEG format, a BMP format, a GIF format, a PNG format, etc. As another example, the target character stream data may be converted into scan status information such as a model image, a flash animation, text information, or the like, or any combination thereof. In some embodiments, the target character stream may be traversed, and a deserialization process may be performed on the target character stream data to generate the optical image (and/or the scan status information). The scanning image, the optical image and/or the scan status information may be further output to the display device for display.

In some embodiments, as described in connection with operation 720, the character stream data corresponding to the optical image (and/or the scan status information) may be stored correspondingly with the scanning image based on path information. For example, the scanning image may be stored in a storage file (e.g., the second storage file), the character stream data may be stored in a third storage file, and path information of the third storage file may be stored in a storage space (e.g., a second storage space) of the second storage file. In response to receiving the request for viewing the scanning image of the target scan object from the user, the scanning image may be obtained or read from the second storage file. Further, the path information of the third storage file may be obtained from the second storage space of the second storage file, and the third storage file may be obtained based on the path information. Correspondingly, the character stream data corresponding to the optical image (and/or the scan status information) may be obtained from the third storage file. In some embodiments, the optical image (and/or the scan status information) may be generated based on the character stream data. For example, a deserialization process may be performed on the character stream data to generate the optical image (and/or the scan status information). In such cases, the scanning image, the optical image and/or the scan status information may be output based on the request.

According to the image storage processes provided in the present disclosure, a scanning image of a target scan object may be obtained, and an optical image of the target scan object may be obtained by using, e.g., a piece of photographic equipment, during the scanning process of the scanning image. Character stream data may be obtained by performing a serialization process on the optical image according to a predetermined format. The character stream data may be stored correspondingly with the scanning image. In response to receiving, from a user, a request for viewing the scanning image, the scanning image and the optical image corresponding to the scanning image may be output to a display device for display. According to the image storage processes, the optical image and/or the scan status information may be stored and/or displayed correspondingly with the scanning image. Therefore, the user may trace back to the optical image and/or the scan status information quickly when viewing the scanning image, thereby improving the effectiveness, efficiency, and/or accuracy in analyzing the scanning image.

It should be noted that the above description of the process 700 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 8:
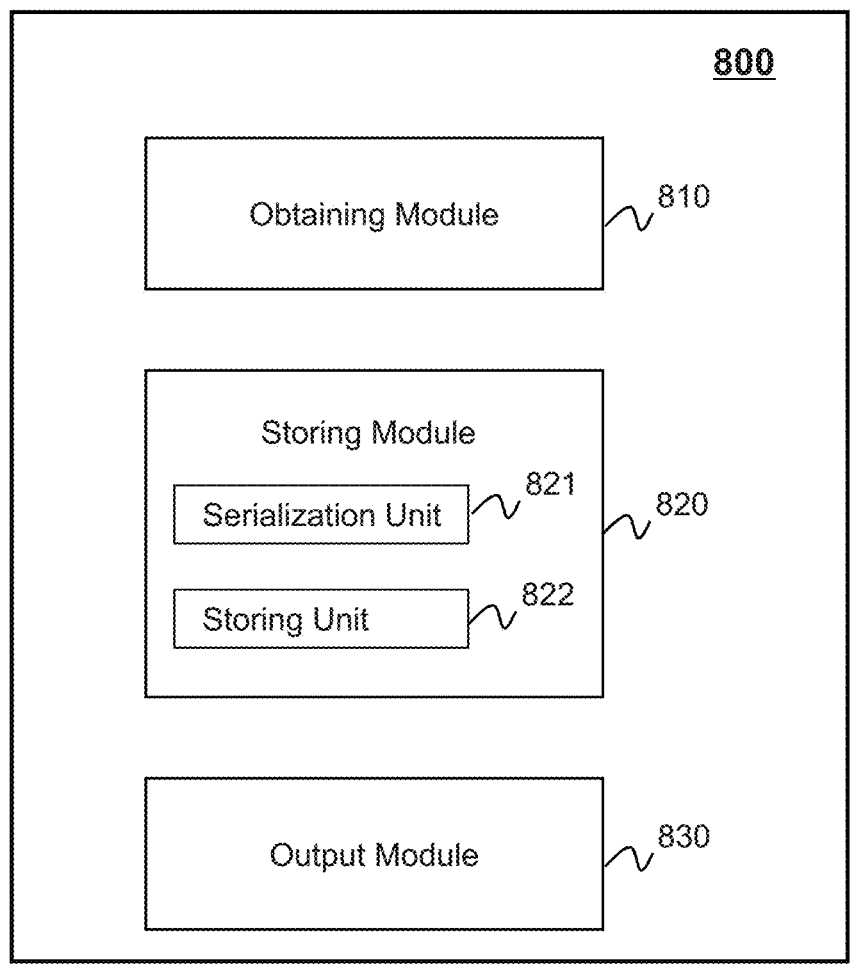
FIG. 8 is a block diagram illustrating an exemplary processing device according to some embodiments of the present disclosure.

FIG. 8 is a block diagram illustrating an exemplary processing device according to some embodiments of the present disclosure. In some embodiments, the processing device 800 may be implemented on various devices (e.g., the computing device 200 illustrated in FIG. 2, the mobile device 300 illustrated in FIG. 3). In some embodiments, the processing device 800 may be integrated into the processing device 140. As shown in FIG. 8, the processing device 800 may include an obtaining module 810 and a storing module 820.

The obtaining module 810 may be configured to obtain a scanning image of a target scan object, and/or obtain an optical image of the target scan object acquired by using a piece of photographic equipment during the scanning process of the scanning image. The optical image may include scan status information of the target scan object.

The storing module 820 may be configured to store the optical image (and/or the scan status information) of the target scan object correspondingly with the scanning image. Specifically, in some embodiments, the storing module 820 may include a serialization unit 821 and a storing unit 822. The serialization unit 821 may perform a serialization process on the optical image (and/or the scan status information) of the target scan object according to a predetermined format and obtain character stream data. Further, the storing unit 822 may store the character stream data correspondingly with the scanning image. In some embodiments, the storing unit 822 may be configured to store the optical image (and/or the scan status information) of the target scan object in a same file as the scanning image such that the optical image is stored correspondingly with the scanning image. Specifically, in some embodiments, the storing unit 822 may store the scanning image in a storage file, and store the character stream data in a pre-created storage space of the storage file. Optionally or additionally, the storing unit 822 may be configured to store the character stream data correspondingly with the scanning image based on path information. Specifically, in some embodiments, the storing unit 822 may store the scanning image in a second storage file, and store the character stream data in a third storage file. The second storage file may include a second storage space, and the storing unit 822 may store the path information of the third storage file in the second storage space, so that the second storage file is associated with the third storage file. In such cases, the character stream data may be stored correspondingly with the scanning image based on the path information.

In some embodiments, the processing device 800 may include an output module 830, an extraction module, and/or a deserialization module. The output module 830 may be configured to output the scanning image, the optical image (and/or the scan status information) corresponding to the scanning image to a display device for display, for example, in response to receiving, from a user, a request for viewing the scanning image of the target scan object. In some embodiments, the scanning image and the character stream data may be stored in a same file (e.g., the storage file described in connection with FIG. 7), and the output module 830 may be configured to obtain the scanning image, the optical image (and/or the scan status information) based on the file. In some embodiments, the character stream data may be stored correspondingly with the scanning image based on path information, and the output module 830 may be configured to obtain the scanning image, the optical image and/or the scan status information based on the path information.

In some embodiments, the scanning image and the character stream data may be stored in a same file (e.g., the storage file described in connection with FIG. 7), and the extraction module may be configured to extract target character stream data from a pre-created storage space of the storage file. The target character stream data may refer to the character stream data of the optical image (and/or the scan status information) corresponding to the scanning image. In some embodiments, the character stream data may be stored correspondingly with the scanning image based on path information, and the extraction module may be configured to extract the target character stream data from a third storage file that stores the target character stream data according to the path information stored in the second storage file.

The deserialization module may be configured to perform a deserialization process on the target character stream data and obtain the optical image (and/or the scan status information) of the target scan object.

The modules in the processing device 800 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the processing device 800 may also include a display module, which may be configured to display the scanning image, the optical image and/or the scan status information. As another example, the extraction module and the deserialization module may be configured as two units in the output module 830.

Figure 9:
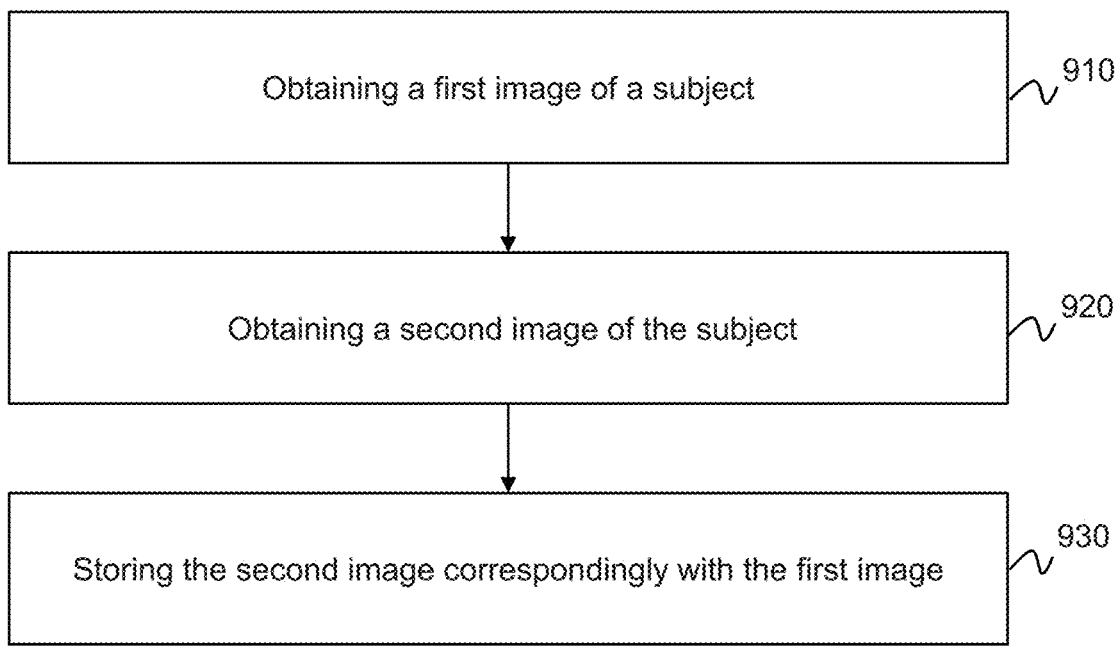
FIG. 9 is a flowchart illustrating an exemplary process for image storage according to some embodiments of the present disclosure.

FIG. 9 is a flowchart illustrating an exemplary process for image storage according to some embodiments of the present disclosure. In some embodiments, at least part of process 900 may be performed by the processing device 140 (implemented in, for example, the computing device 200 shown in FIG. 2). For example, the process 900 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, one or more modules or units illustrated in FIG. 8). The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 910, the processing device 140 (e.g., the obtaining module 810) may obtain a first image (e.g., a scanning image) of a subject (also referred to as a "target scan object"). In 920, the processing device 140 (e.g., the obtaining module 810) may obtain a second image (e.g., an optical image) of the subject.

As described in connection with operation 410, the subject may include a patient, a man-made object, etc. In some embodiments, the subject may include a specific portion, organ, and/or tissue of a patient. For example, the subject may include a head, a brain, a neck, a body, a shoulder, an arm, a thorax, a cardiac, a stomach, a blood vessel, a soft tissue, a knee, feet, or the like, or any combination thereof.

In some embodiments, the first image may be acquired by a scanning device, and the second image may be acquired by a capture device (e.g., a piece of photographic equipment). For example, the first image may be a medical image acquired based on an interaction between the subject (e.g., a human body) and a medium provided by the scanning device (e.g., the scanning device 111 illustrated in FIG. 1). The first image may be used to express internal information (e.g., a structure and/or a density of internal tissues and organs of the human body) of the subject. More descriptions of the mediums and the scanning device may be found elsewhere in the present disclosure (e.g., FIG. 4 and descriptions thereof). In some embodiments, the optical image may be acquired by using the capture device (e.g., the capture device 112 illustrated in FIG. 1). More descriptions of the capture device may be found elsewhere in the present disclosure (e.g., FIG. 4 and descriptions thereof).

In some embodiments, the first image may be acquired by a first component of a scanning device, and the second image may be acquired by a second component of the scanning device. For example, the scanning device may include one or more scanners that are configured as the first component, and one or more pieces of photographic equipment may be disposed inside the scanning device and used as the second component.

In some embodiments, the second image may include scan status information of the subject. The scan status information may be associated with a status of the subject when the first image is acquired. More descriptions of the scan status information and the determination of the scan status information may be found elsewhere in the present disclosure (e.g., FIG. 4 and descriptions thereof).

In some embodiments, the first image may include a 2D image, and the second image may include a video frame. In some embodiments, the first image may include a 3D image, and the second image may include a video. Taking a CT scanning process as an example, scan data of the subject may be acquired by a CT scanning device and a video of the subject may be acquired by a piece of photographic equipment during the CT scanning process. Further, a 2D tomographic image corresponding to a specific time point of the CT scanning process may be obtained by performing an image reconstruction process on at least part of the scan data, and the 2D tomographic image may be associated with (or correspond to) a video frame at the specific time point in the video. In such cases, the 2D tomographic image may be determined as the first image, and the video frame may be determined as the second image. Optionally or additionally, a 3D image (and/or a plurality of 2D tomographic images corresponding to a plurality of (e.g., each) time point of the CT scanning process) may be obtained based on the scan data. In such cases, the 3D image may be determined as the first image, and the video may be determined as the second image.

In some embodiments, the first image and the second image may be acquired simultaneously. For example, signals and/or instructions may be sent to the scanning device (or the first component of the scanning device) and the piece of photographic equipment (or the second component of the scanning device) (e.g., at the same time) to cause the scanning device and the piece of photographic equipment to work simultaneously.

In some embodiments, the processing device 140 may obtain the first image from the scanning device (or the first component of the scanning device) and obtain the second image from the piece of photographic equipment (or the second component of the scanning device), directly. In some embodiments, the first image and the second image acquired simultaneously may be stored in a storage device (e.g., the storage device 150) disclosed elsewhere in the present disclosure. The processing device 140 may obtain the first image and/or the second image from the storage device.

In 930, the processing device 140 (e.g., the storing module 820) may store the second image correspondingly with the first image. In some embodiments, to store the second image correspondingly with the first image, the processing device 140 may store the second image and the first image in a same file.

In some embodiments, the processing device 140 may obtain character stream data corresponding to the second image based on the second image. Specifically, in some embodiments, the processing device 140 may obtain the character stream data by performing a serialization process on the second image. More descriptions of the serialization process may be found elsewhere in the present disclosure (e.g., FIG. 4, FIG. 7, and descriptions thereof). In some embodiments, the processing device 140 may perform the serialization process on the second image according to a predetermined format (e.g., a DICOM standard format).

Further, in some embodiments, the processing device 140 may store the character stream data correspondingly with the first image. Specifically, in some embodiments, the processing device 140 may store the first image in a first storage file (e.g., a DICOM standard format file). In some embodiments, the first storage file may include a first storage space (e.g., a private tag space of the DICOM standard format file). The processing device 140 may further store the character stream data in the first storage space of the first storage file. In such cases, the character stream data may be stored correspondingly with the first image.

In some embodiments, to store the character stream data correspondingly with the first image, the processing device 140 may store the first image in a second storage file. The second storage file may include a second storage space. Further, in some embodiments, the processing device 140 may store the character stream data in a third storage file. In some embodiments, the processing device 140 may store path information of the third storage file in the second storage space of the second storage file. More descriptions of the path information may be found elsewhere in the present disclosure (e.g., FIG. 7 and descriptions thereof). In such cases, the character stream data may be stored correspondingly with the first image based on path information.

In some embodiments, the processing device 140 may also store the scan status information correspondingly with the first image. For example, the processing device 140 may determine the scan status information by analyzing the second image. Further, the processing device 140 may obtain character stream data by performing a serialization process on the scan status information. Furthermore, the processing device 140 may store the scan status information correspondingly with the first image in a similar way as storing the second image correspondingly with the first image. More description regarding the storing of the second image correspondingly with the first image may be found elsewhere in the present disclosure (e.g., FIG. 7 and the descriptions thereof).

It should be noted that the above description of the process 900 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. According to the image storage method illustrated in the process 900, the first image may be stored and/or displayed correspondingly with the second image. A user (e.g., a doctor) may trace scan status information of the subject accurately when analyzing the scanning image, thereby assisting or facilitating the user to analyze the scanning image effectively, efficiently, and/or accurately based on the optical image. Moreover, redundant information generated during a storage process may be reduced by storing the first image correspondingly with the second image, thereby saving storage space and improving efficiency of image storage and/or image display.

Figure 10:
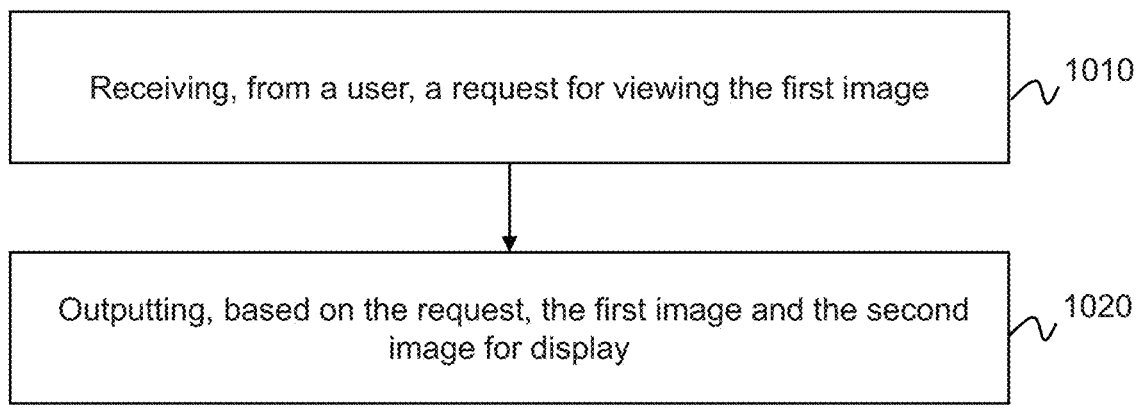
FIG. 10 is a flowchart illustrating an exemplary process for outputting an image according to some embodiments of the present disclosure.

FIG. 10 is a flowchart illustrating an exemplary process for outputting an image according to some embodiments of the present disclosure. In some embodiments, at least part of process 1000 may be performed by the processing device 140 (implemented in, for example, the computing device 200 shown in FIG. 2). For example, the process 1000 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, one or more modules or units illustrated in FIG. 8). The operations of the illustrated process presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1010, the processing device 140 may receive a request for viewing the first image from a user.

In some embodiments, the request may be input by the user via a computing device (e.g., the I/O 230 of the computing device 200) or a mobile device (e.g., the I/O 350 of the mobile device 300). For example, the I/O 230 or the I/O 350 may include an input device such as a keyboard, a mouse, a touch screen, a microphone, a trackball, or the like, or a combination thereof, and the user may input the request by using the input device. In some embodiments, the request may be further provided or transmitted to the processing device 140 and/or other components of the image storage system 100 (e.g., via the network 120).

In 1020, the processing device 140 may output the first image and the second image for display based on the request.

In some embodiments, as described in connection with operation 930, the first image may be stored in a first storage file and character stream data corresponding to the second image may be stored in a first storage space of the first storage file. In such cases, the processing device 140 may obtain the first image from the first storage file and obtain the character stream data corresponding to the second image from the first storage space of the first storage file. Further, the processing device 140 may generate the second image based on the character stream data. For example, the processing device 140 may generate the second image by performing a deserialization process on the character stream data. Furthermore, the processing device 140 may output the first image and the second image based on the request.

In some embodiments, as described in connection with operation 930, the first image may be stored in a second storage file the character stream data corresponding to the second image may be stored in a third storage file, and path information of the third storage file may be stored in a second storage space of the second storage file. In such cases, the processing device 140 may obtain the first image from the second storage file, and obtain path information of the third storage file from the second storage space of the second storage file. Further, the processing device 140 may obtain the third storage file based on the path information, and obtain the character stream data corresponding to the second image from the third storage file. Furthermore, the processing device 140 may generate the second image based on the character stream data. For example, the processing device 140 may generate the second image by performing a deserialization process on the character stream data. In some embodiments, the processing device 140 may output the first image and the second image based on the request.

In some embodiments, the processing device 140 may also output the scan status information for display based on the request in a similar way as outputting the first image and the second image for display. More description regarding outputting the first image and the second image (or the scan status information) for display may be found elsewhere in the present disclosure (e.g., FIG. 7 and the descriptions thereof).

It should be noted that the above description of the process 1000 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

In some embodiments, the present disclosure may also provide a computer readable storage medium storing a computer program. When the computer program is executed by a processor (e.g., the processing device 140), an image storage method provided in the present disclosure may be implemented. The method may include obtaining a scanning image of a target scan object, and obtaining an optical image of the target scan object acquired by using a piece of photographic equipment during the scanning process of the scanning image. The optical image may include scan status information of the target scan object. The method may also include storing the optical image (and/or the scan status information) correspondingly with the scanning image.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method for image storage, implemented on at least one machine each of which has at least one processor and at least one storage device, comprising:
   obtaining a first image of a subject, wherein the first image is a medical scanning image;
   concurrently obtaining a second image of the subject, the second image comprising scan status information of the subject, the scan status information being associated with a status of the subject when the first image is acquired, wherein the second image is an optical image; and
   storing the second image correspondingly with the first image, wherein storing the second image correspondingly with the first image comprises storing the second image as characters of a predetermined format file in which the first image is stored or storing the second image correspondingly with the first image based on path information of a storage file of the second image, comprising:
    storing the first image in a second storage file, the second storage file being a Digital Imaging and Communications in Medicine (DICOM) standard format file;
    storing the second image in a third storage file; and
    storing path information of the third storage file in a private tag space of the second storage file.

2. The method of claim 1, further comprising:
    storing the scan status information correspondingly with the first image.

3. The method of claim 1, wherein a shooting region of the second image is larger than a scanning region of the first image.

4. The method of claim 1, wherein the storing the second image correspondingly with the first image comprises:
    obtaining, based on the second image, character stream data corresponding to the second image; and
    storing the character stream data correspondingly with the first image.

5. The method of claim 4, wherein the obtaining, based on the second image, character stream data corresponding to the second image comprises:
    obtaining the character stream data by performing a serialization process on the second image.

6. The method of claim 4, wherein the storing the character stream data correspondingly with the first image comprises:
    storing the first image in a first storage file, the first storage file including a first storage space; and
    storing the character stream data in the first storage space of the first storage file.

7. The method of claim 1, wherein
    the first image is acquired by a medical scanning device, and the second image is acquired by a piece of optical photographic equipment.

8. The method of claim 7, wherein the position of the piece of optical photographic equipment is adjustable based on scanning parameters of the radiation source.

9. The method of claim 7, wherein the first image includes a 2D image corresponding to a time point of a scanning process of the medical scanning device, and the second image includes a video frame in a video corresponding to the scanning process at the time point.

10. The method of claim 7, wherein the first image includes a 3D image corresponding a scanning process of the medical scanning device, and the second image includes a video corresponding to the scanning process.

11. The method of claim 1, further comprising:
    receiving, from a user, a request for viewing the first image; and
    outputting, based on the request, the first image and the second image for display.

12. The method of claim 11, wherein the outputting, based on the request, the first image and the second image for display comprises:
    obtaining, from a first storage file, the first image;
    obtaining, from a first storage space of the first storage file, character stream data corresponding to the second image;
    generating, based on the character stream data, the second image; and
    outputting, based on the request, the first image and the second image.

13. The method of claim 12, wherein the generating, based on the character stream data, the second image comprises:
    generating the second image by performing a deserialization process on the character stream data.

14. The method of claim 11, wherein the outputting, based on the request, the first image and the second image for display comprises:
    obtaining, from a second storage file, the first image;
    obtaining, from a second storage space of the second storage file, path information of a third storage file that stores character stream data corresponding to the second image;
    obtaining, based on the path information, the third storage file;
    obtaining, from the third storage file, the character stream data corresponding to the second image;
    generating, based on the character stream data, the second image; and
    outputting, based on the request, the first image and the second image.

15. The method of claim 1, wherein the storing the second image and the first image in a same file comprises converting the second image into a file format that is the same as the first image.

16. The method of claim 1, wherein the scan status information includes a respiration phase of the subject.

17. The method of claim 1, wherein a shooting angle of the second image is the same as or similar to a scanning angle of the first image, so that a perspective of the second image is the same as or similar to a perspective of the first image.

18. The method of claim 1, wherein a shooting region of the second image is obtained based on a mark projected on the subject when acquiring the optical image, the mark is generated by a projection device installed into a piece of photographic equipment and is further projected in the shooting region.

19. A system for image storage, comprising:
    at least one storage medium including a set of instructions; and
    at least one processor in communication with the at least one storage medium, wherein when executing the set of instructions, the at least one processor is directed to cause the system to:
        obtain a first image of a subject, wherein the first image is a medical scanning image;
        concurrently obtain a second image of the subject, the second image comprising scan status information of the subject, the scan status information being associated with a status of the subject when the first image is acquired, wherein the second image is an optical image, a shooting angle of the second image is the same as or similar to a scanning angle of the first image, so that a perspective of the second image is the same as or similar to a perspective of the first image, and a shooting region of the second image is obtained based on a mark projected on the subject when acquiring the optical image, the mark is generated by a projection device installed into a piece of photographic equipment and is further projected in the shooting region; and
        store the second image correspondingly with the first image, wherein storing the second image correspondingly with the first image comprises storing the second image as characters of a predetermined format file in which the first image is stored or storing the second image correspondingly with the first image based on path information of a storage file of the second image, comprising:
  storing the first image in a second storage file, the second storage file being a Digital Imaging and Communications in Medicine (DICOM) standard format file;
  storing the second image in a third storage file; and
  storing path information of the third storage file in a private tag space of the second storage file.

20. A method for imaging, implemented on at least one machine each of which has at least one processor and at least one storage device, comprising:
  acquiring a first image of a subject, wherein the first image is a medical scanning image;
  concurrently acquiring a second image of the subject, the second image comprising scan status information of the subject, the scan status information being associated with a status of the subject when the first image is acquired, the second image being an optical image;
  storing the second image correspondingly with the first image, wherein storing the second image correspondingly with the first image comprises storing the second image as characters of a predetermined format file in which the first image is stored or storing the second image correspondingly with the first image based on path information of a storage file of the second image, comprising:
    storing the first image in a second storage file, the second storage file being a Digital Imaging and Communications in Medicine (DICOM) standard format file;
    storing the second image in a third storage file; and
    storing path information of the third storage file in a private tag space of the second storage file; and
  outputting the first image correspondingly with the second image to a display device for display, including:
    receiving, from a user, a request for viewing the first image; and
    outputting, based on the request, the first image and the second image for display.

* * * * *